(12) United States Patent
McMahon et al.

(10) Patent No.: US 7,980,812 B2
(45) Date of Patent: Jul. 19, 2011

(54) LOW PRESSURE TURBINE ROTOR DISK

(75) Inventors: Ryan C. McMahon, North Palm Beach, FL (US); Jack W. Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 895 days.

(21) Appl. No.: 11/975,674

(22) Filed: Oct. 19, 2007

(65) Prior Publication Data

US 2010/0284794 A1 Nov. 11, 2010

Related U.S. Application Data

(60) Provisional application No. 60/963,084, filed on Aug. 2, 2007.

(51) Int. Cl.
*F03B 11/06* (2006.01)
*F04D 29/10* (2006.01)

(52) U.S. Cl. .................. 415/110; 416/90 R; 416/234

(58) Field of Classification Search .................. 415/110, 415/115, 229; 416/234, 93 R, 90 R
See application file for complete search history.

(56) References Cited

U.S. PATENT DOCUMENTS

| | | | |
|---|---|---|---|
| 4,152,816 A | 5/1979 | Ewing et al. | |
| 4,270,256 A | 6/1981 | Ewing | |
| 4,568,516 A | 2/1986 | Adlerborn et al. | |
| 4,628,008 A | 12/1986 | Conolly | |
| 5,454,222 A | 10/1995 | Dev | |
| 5,526,640 A | 6/1996 | Brooks et al. | |
| 6,471,485 B1 | 10/2002 | Rossmann et al. | |
| 7,097,415 B2 * | 8/2006 | Bart et al. | 415/69 |

* cited by examiner

*Primary Examiner* — Edward Look
*Assistant Examiner* — Dwayne J White
(74) *Attorney, Agent, or Firm* — John Ryznic

(57) ABSTRACT

A low pressure turbine rotor disk for a small twin spool gas turbine engine in which the rotor disk includes a forward side cavity large enough to allow for the bearing assembly that rotatably supports the rotor disk to fit within the cavity in order to shorten the axial distance between the bearings that support the inner rotor shaft on which the turbine rotor disk is secured. Minimizing the bearings spacing allows for a high critical speed for the inner rotor shaft and therefore allows for the small twin spool gas turbine engine to operate at this small scale. The turbine rotor disk also includes a plurality of axial aligned cooling air holes to allow for cooling air from the bearings to flow out from the aft end of the rotor disk. The inner surface of the cavity is an annular surface that forms a seal with knife edges extending outward from the bearing support plate also located within the cavity. The rotor disk includes an annular groove facing outward and on the rear side of the disk to allow for a tool to be inserted for removing the rotor disk from the shaft. An axial central opening in the rotor disk allows for insertion of the shaft and is formed with a bearing race abutment surface on the forward side and a nut abutment surface of the aft side used to compress the rotor disk assembly on the inner rotor shaft.

19 Claims, 4 Drawing Sheets

LOW PRESSURE TURBINE ROTOR DISK

CROSS-REFERENCE TO RELATED APPLICATIONS

This application is claims the benefit to an earlier filed U.S. Provisional application 60/963,084 filed on Aug. 2, 2007 and entitled SMALL TWIN SPOOL GAS TURBINE ENGINE the entire disclosure of which is incorporated herein by reference.

This application is also related to U.S. application Ser. No. 11/903,553 filed on Dec. 6, 2007 entitled HIGH SPEED ROTOR SHAFT FOR A SMALL TWIN SPOOL GAS TURBINE ENGINE; and related to U.S. application Ser. No. 11/903,555 filed on Dec. 12, 2007 entitled HIGH SPEED ROTOR SHAFT AND TURBINE ROTOR DISK ASSEMBLY; and related to U.S. application Ser. No. 11/903,554 filed on Dec. 21, 2007 entitled HIGH SPEED ROTOR SHAFT AND COMPRESSOR ROTOR DISK ASSEMBLY; and related to U.S. application Ser. No. 11/903,556 filed on Dec. 21, 2007 entitled TWIN SPOOL ROTOR ASSEMBLY FOR A SMALL GAS TURBINE ENGINE, all of the above being incorporated herein by reference.

GOVERNMENT LICENSE RIGHTS

This invention was made with Government support under Contract No. W31P4Q-05-C-R003 awarded by the US Army. The Government has certain rights in the invention.

BACKGROUND OF THE INVENTION

1. Field of the Invention

The present invention relates generally to a small twin spool gas turbine engine, and more specifically to a low pressure turbine rotor disk for use in the small twin spool gas turbine engine.

2. Description of the Related Art Including Information Disclosed Under 37 CFR 1.97 and 1.98

A gas turbine engine is a very efficient power plant and is used to power an aircraft such as a commercial or military aircraft or an unmanned aero vehicle (UAV). The PW4000 series engine made by Pratt & Whitney Aircraft Group is a large commercial turbofan engine with a dual-shaft (twin spool) and high bypass front fan. This engine produces 60,000 pounds of thrust and weighs 9,200 pounds dry. It is a very efficient engine. A twin spool engine has about two times the efficiency of a single spool engine and therefore the twin spool engine is used when efficiency is an important factor.

Recent developments in small unmanned aircraft, such as a UAV, have led to the use of small gas turbine engines to power these small aircraft. The more efficient the engine is in the UAV, the longer will be the loiter time. Small single spool gas turbine engines have been around for years to power small radio controlled planes or even a UAV such as a cruise missile or a video surveillance aircraft. With the demand for longer loiter times, a more fuel efficient gas turbine engine is desirable.

It has been common in the art of gas turbine engine design to scale down larger engines to the size needed. A small UAV only requires a few hundred pounds of thrust to power the aircraft. One major problem in the design of small gas turbine engines is scaling the larger engine down to the smaller size. A larger engine can only be scaled down so far before design problems start to surface, such as problems with the critical rotation speed of the shaft becoming lower than the operational speed of the shaft. As the size of the engine decreases, the rotational speed of the rotor shaft must increase in order to retain the high overall efficiency for a gas turbine engine. As the rotor shaft speed increases, the rotor dynamics becomes a major problem. A large gas turbine engine such as the PW4000 series engine cannot be scaled down below a certain size before the rotor dynamics and natural frequency problems start to cause problems. The low speed rotor shaft in the PW4000 series engine can be scaled down only so far before the bending mode (third mode) of the rotor shaft coincides with the natural frequency of the shaft. This is referred to in rotor dynamics as the critical speed. At the critical speed, a rotary shaft would break apart from the high bending stresses developed at the critical speed. The bending displacement would be infinite without adequate damping of the bearings. Engineers attempt to design the rotor shaft to operate below the critical speed so that these rotor dynamic problems do not occur. Thus, the original design for a rotor shaft used in the larger prior art gas turbine engine would not function at the smaller size because the shaft operating speed would be larger than the critical speed and therefore making the smaller scaled down engine inoperable.

In a twin spool gas turbine engine, a low pressure fan or compressor and a low pressure turbine are rotatably attached to the inner or low speed rotor shaft. A high pressure compressor and high pressure turbine are rotatably attached to the outer or high speed rotor shaft. Each shaft is rotatably supported by bearings on the shaft ends. The natural frequency of a rotating shaft is directly proportional to a ratio of the stiffness to the mass of the shaft. Thus, the natural frequency of the rotating shaft can be increased by either increasing the stiffness of the shaft, decreasing the mass of the shaft, or both.

Also, in the rotating shaft supported by bearings on both ends, as the length between the bearings increases, the natural frequency decreases. If the shaft is lengthened and thus the distance between the bearings, the natural frequency will be lowered. Thus, to produce a small gas turbine engine useful for a UAV or other small aircraft with a thrust of less than around 300 pounds, and to provide for a twin spool gas turbine engine in order to significantly improve the fuel efficiency of the engine, a new design is required for the inner and the outer rotor shafts to make such an engine operational. The inner and outer rotor shafts in a twin spool gas turbine engine requires a new design for each shaft since the prior art twin spool engines cannot be scaled down to this level without the rotor dynamics problems occurring that limit the size of the shaft.

U.S. Pat. No. 5,454,222 issued to Dev on Oct. 3, 1995 and entitled SMALL GAS TURBINE ENGINE HAVING ENHANCED FUEL ECONOMY discloses a gas turbine engine having twin spools that has a smaller size and lesser weight than current turbine engines having the same power (at the time of the Dev invention) with a core engine having a diameter of about 0.35 meters (about 14 inches) that operates at about 54,000 rpm. As can be seen from the figures in the Dev patent, the inner or low speed rotor shaft is a straight solid shaft while the outer rotor shaft is solid but somewhat curved to conform to the radial compressor and turbine on the shaft. The twin spool engine of the Dev patent would be typical of the prior art twin spool gas turbine engines in that these engines cannot be scaled down any further because the rotor shafts would have to operate at higher speeds which would then produce the rotor dynamics problems discussed above. The limit of size for the Dev engine is reached.

It is an object of the present invention to provide for a small twin spool gas turbine engine.

Another object of the present invention is to provide for a low pressure turbine rotor disk that will allow for a shorter spacing between bearings that support the rotor shaft of the rotor disk.

BRIEF SUMMARY OF THE INVENTION

A twin spool rotor shaft assembly for a small gas turbine engine in which the low speed shaft is a hollow shaft with bearing support ends at a minimal axial spacing in order to provide for a critical speed well above the engine operating speed in order to make such a small twin spool gas turbine engine possible. The low speed shaft is hollow in order to provide for the rigidity of the inner shaft. The hollow inner shaft is made from two section that are orbital welded together to limit the amount of weld material that typically would build up inside the hollow shaft. The outer rotor shaft is open on the aft end to allow for the inner shaft to be assembled within the outer shaft. The outer shaft is attached to the turbine rotor disk by a snap ring and by a tight fit between the shaft and disk.

The inner shaft includes ends supported by bearings in which the ends are solid shafts to provide flexibility. The inner shaft ends are supported by bearings that are mounted on supports that are part of the guide vane assembly in the forward end of the engine and by second stage vanes on the aft end of the engine. The inner shaft includes sleeve members that are concentrically mounted over the forward and aft ends of the inner shaft and provide a preload tensile force to the inner shaft ends so that the twin spool rotor shaft assembly does not become loosened during engine operation.

The inner and outer rotor shafts are shaped to minimize the space between the two shafts in order to reduce the radial size of the outer rotor shaft to allow for the operation of the small engine. The space between the inner and the outer shafts also forms a cooling air passage from the compressor outlet to the rim cavity to prevent hot gas flow from the turbine from passing through the aft bearings.

DETAILED DESCRIPTION OF THE INVENTION

The present invention is a low pressure turbine rotor disk for a small twin spool gas turbine engine, and a process for manufacturing a cast rotor disk with less amounts of voids or air bubbles in order to increase the structural strength of the turbine rotor disk.

Figure 1:
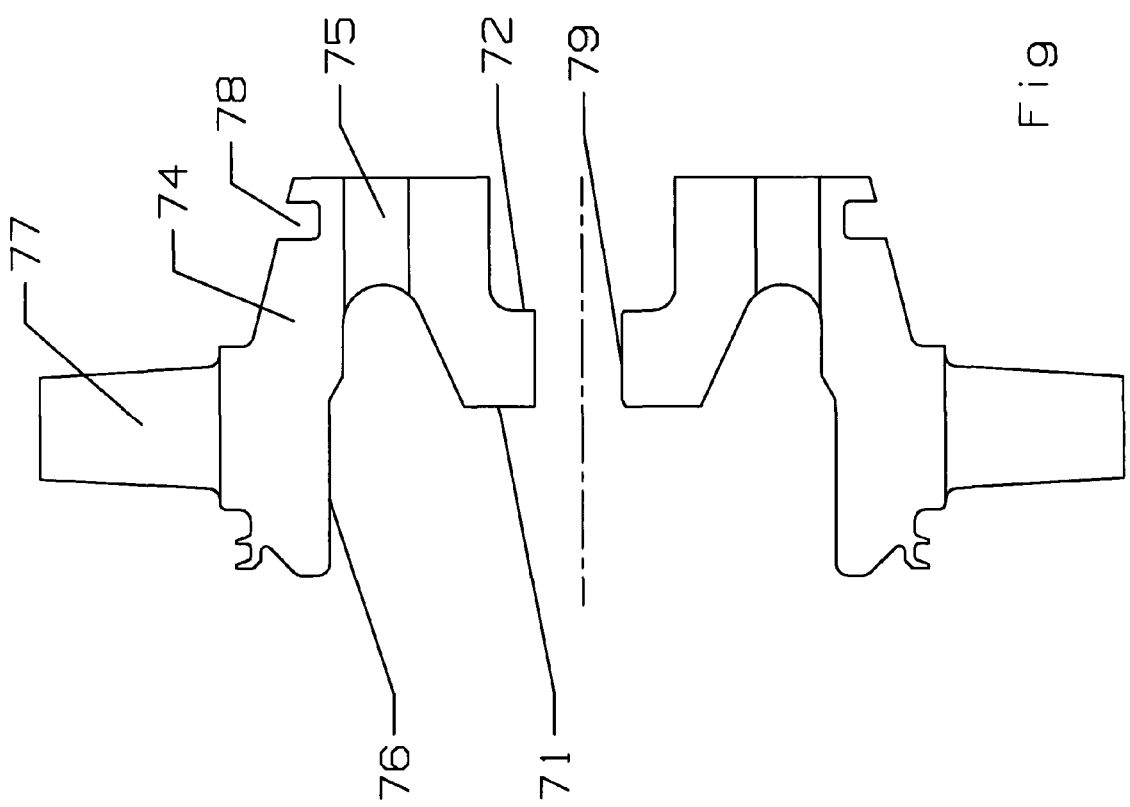
FIG. 1 shows a cross section view of the low pressure turbine rotor disk of the present invention.
Figure 2:
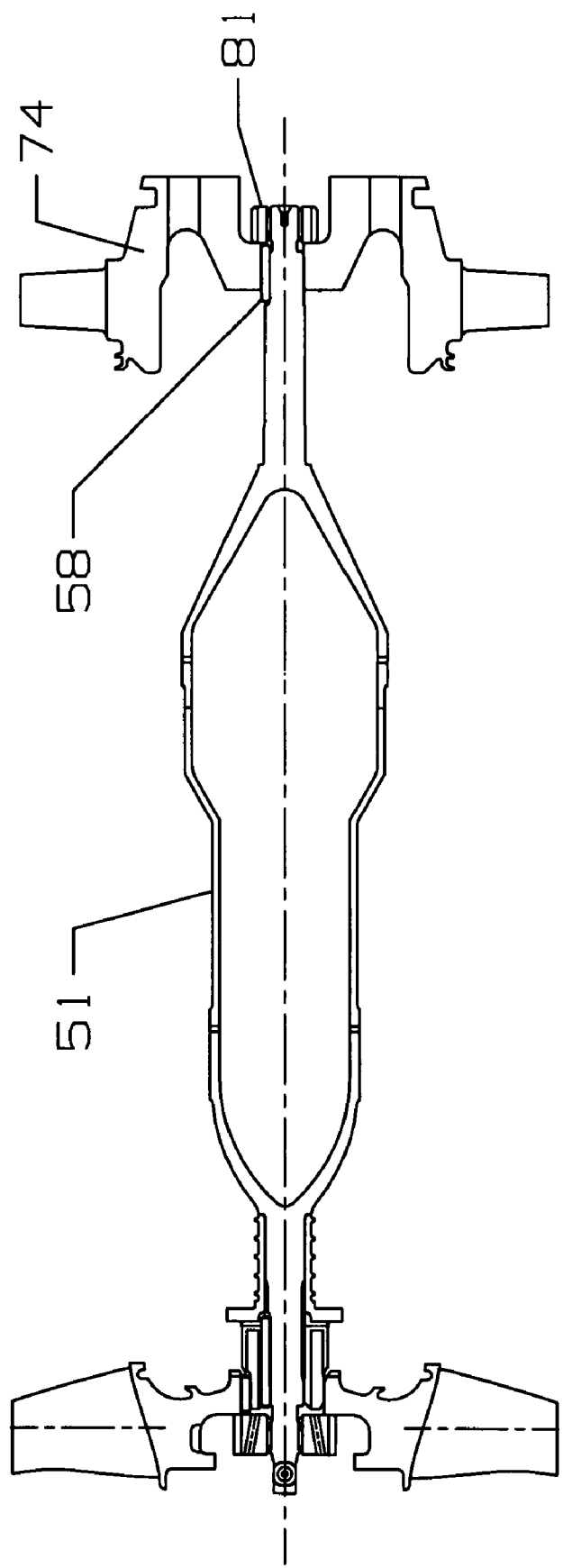
FIG. 2 shows a cross section view of the low speed rotor shaft assembly of the present invention.

The low pressure turbine rotor disk 74 is shown in FIG. 1 and is connected to the to the inner rotor shaft 51 on the aft end as shown in FIG. 2. The low pressure turbine rotor disk 74 is a single piece called an integrally bladed rotor (or, IBR) which is cast or machined (high speed machining) instead of forged. The rotor disk 74 includes a plurality of blades 77 extending from the outer disk surface, a plurality of axial holes 75 passing through the rotor disk 74, and a forward side cavity having an inner axial surface 76. In the present embodiment, 6 of the axial cooling holes 75 are used and they are evenly spaced in a circumference to minimize the unbalance of the rotor disk 74. However, more or less axial cooling holes could be used depending upon the cooling air flow through the rotor disk 74. In a larger engine, no cooling holes may be needed since the cooling air passing from the bearings could be discharged out from the engine through the rotor shaft or other rotor disk bypass passages. The axial holes 75 reduce the structural rigidity of the rotor disk so a hole-less rotor disk would have the greatest strength.

The turbine rotor disk 74 is made from Inconel 713 and has the turbine blades 77 formed into the rotor disk to form an integral bladed rotor or an IBR. The turbine disk 74 is an IBR in order to reduce the leakage across the turbine disk and eliminate the need for attachments or cover plates in order to reduce the weight. In the preferred embodiment, the turbine rotor disk 74 is cast or machined instead of forged. The casting process includes the hot isostatic press (HIP) in the order of 20,000 psi to reduce the amount of voids left in the cast piece. Voids or porosity can result in a weaker structure or leads to cracks that can damage the disk. During the HIP process, the casting is heated up to a temperature just below melting temperature, and the high pressure gas will remove voids formed during the casting process.

An annular groove 78 is formed on the aft end of the rotor disk 74 and facing outward. The axial holes 75 allow for the bearing cooling air to pass out the rear end of the turbine rotor disk. The annular groove 78 allows for a tool to be inserted onto the rotor disk in order to pull the rotor disk 74 off of the inner rotor shaft 51. The rotor disk 74 includes an axial central hole 79 in which the inner rotor shaft 51 passes through. One or more pins 58 (FIG. 2) rotatably secure the rotor disk 74 to the inner rotor shaft 51. The pin 58 is inserted from the aft end into slots formed on the adjacent surfaces of the rotor disk 74 and the shaft 51. The inner portion of the rotor disk 74 includes an inner race axial abutment surface 71 on the forward side of the disk 74, and includes a threaded nut axial abutment surface 72 on the aft side of the disk 74.

The inner axial surface 76 forms a forward cavity in the rotor disk 74 is large enough to allow for the inner rotor shaft bearing and the bearing support surface extending from the second stage stator vane assembly to fit within the rotor disk 74 (see FIG. 4) so that the axial distance between the forward inner rotor shaft bearing and the aft inner rotor shaft bearing can be minimized. The axial distance between the bearings that support a rotor shaft is directly related to the critical speed of that shaft. By shortening the axial distance between the bearings that support the inner rotor shaft, the critical speed of the inner rotor shaft is safely above the inner rotor shaft operating speed. Therefore, the small twin spool gas turbine engine of the present invention is possible.

FIG. 2 shows the low pressure turbine rotor disk 74 secured to the aft end of the inner rotor shaft 51 by the threaded nut 81. The pin 58 is secured within slots formed on the inner surface of the axial hole 79 in the rotor disk 74 and the outer surface of the shaft 51. The pin allows for torque to be transmitted between the shaft 51 and the rotor disk 74 such that these two parts rotate together.

Figure 3:
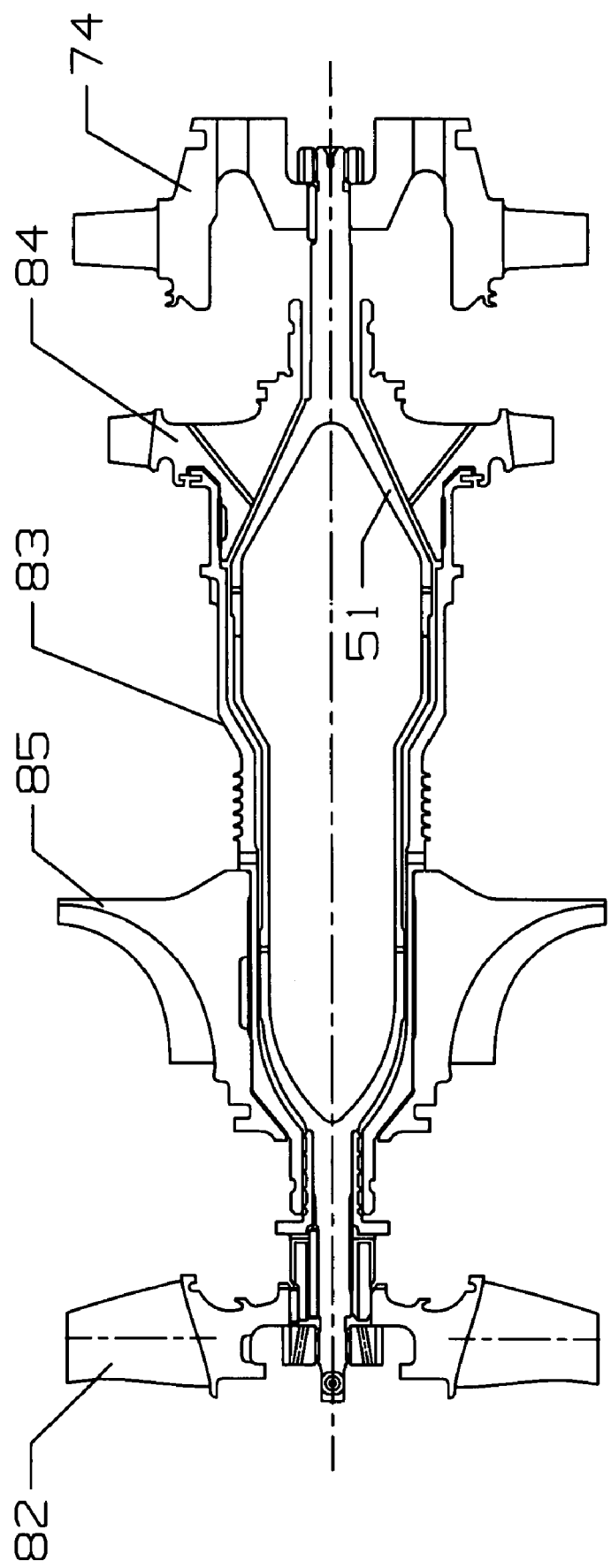
FIG. 3 shows a cross section view of the twin spool assembly of the present invention.

FIG. 3 shows the low pressure turbine rotor disk 74 and the bypass fan 82 both connected to the inner rotor shaft 51 by threaded nuts. The inner rotor shaft 51 rotates within a hollow space formed within the outer rotor shaft 83 which includes a high pressure turbine rotor disk 84 secured on the aft end and a high pressure compressor secured on the forward end of the outer rotor shaft 83.

Figure 4:
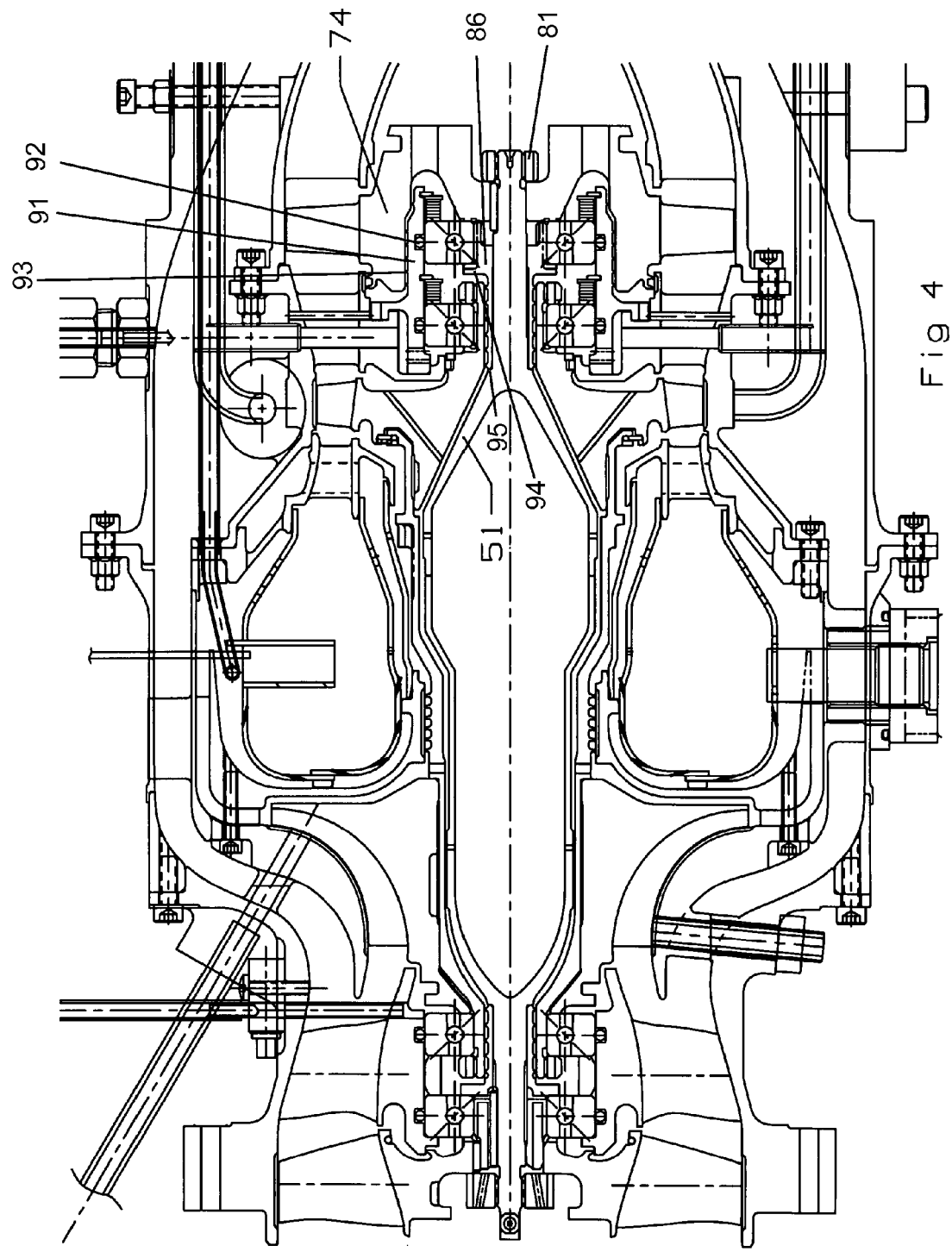
FIG. 4 shows a cross section view of the small twin spool gas turbine engine of the present invention.

FIG. 4 shows the small twin spool gas turbine engine in which the low pressure turbine rotor disk 74 is secured to the low speed rotor shaft 51 with the use of an aft end inner bearing housing 86. The inner bearing housing fits over the solid portion of the inner rotor shaft and abuts against a surface on the inner rotor shaft on the forward end and against the forward edge of the inner race of the bearing as seen in FIG. 4. When the threaded nut 81 is tightened onto the shaft 51, the nut acts through the rotor disk 74, the inner race of the bearing, an abutment surface 94 formed on the inner bearing housing 86 and against the abutment surface 95 on the inner rotor shaft 51 to produce a compression in these parts.

A second stage turbine vane assembly is positioned between the high pressure turbine blades and the low pressure turbine blades as seen in FIG. 4. The second stage vane assembly includes an inner axial extending bearing support surface 91 that extends into the cavity of the low pressure turbine rotor disk 74 and provides a support surface for the aft end bearings of the inner and the outer rotor shafts. The high speed bearing support surface and the low speed bearing support surface on the inner shroud has substantially the same radial diameters as seen in FIG. 4. Annular grooves 92 are formed within the axial extending bearing support surface 91 for the placement of vibration damping rings that make contact with the outer races of the bearings. The outer surface of the axial extending bearings support 91 includes a plurality of knife edges 93 that form a seal with the inner axial surface 76 of the rotor disk 74. The bearing that supports the aft end of the inner rotor shaft 74 is supported on the outer surface of the inner bearing housing. The cavity within the rotor shaft 74 is of such shape and size to allow for the bearing that supports the aft end of the inner rotor shaft 51 to be fully contained within the rotor disk 74. This allows for the axial spacing between the two bearings that support the inner rotor shaft 51 to be minimized in order that the critical speed of the inner rotor shaft will be well above the operating speed of the shaft and the operation of the small twin spool gas turbine engine possible.

I claim the following:

1. A low pressure turbine rotor disk for a small twin spool gas turbine engine, the low pressure turbine rotor disk comprising:
   a rotor disk with a central axial opening to allow for a rotor shaft to be secured to the rotor disk;
   a plurality of turbine blades extending outward from the rotor disk; and,
   a cavity on the forward side of the rotor disk, the cavity being separate from the central axial opening and large enough to fit a bearing assembly that rotatably supports the rotor disk within the cavity.

2. The low pressure turbine rotor disk of claim 1, and further comprising:
   the cavity extends far enough to allow for the bearing to be mounted substantially between the blades extending from the rotor disk.

3. The low pressure turbine rotor disk of claim 1, and further comprising:
   the cavity includes an upper axial extending surface that forms a sealing surface with a knife edge seal.

4. The low pressure turbine rotor disk of claim 1, and further comprising:
   an axial aligned cooling air hole in the rotor disk opening into the cavity on one side and opening onto the aft end of the rotor disk on the other side.

5. The low pressure turbine rotor disk of claim 1, and further comprising:
   the central axial opening is formed by a forward bearing race abutment surface and an aft nut abutment surface.

6. The low pressure turbine rotor disk of claim 1, and further comprising:
   at least one slot formed on the inner surface of the central axial opening of the rotor disk for insertion of a pin to rotatably secure the rotor disk to the inner rotor shaft.

7. The low pressure turbine rotor disk of claim 1, and further comprising:
   the rotor disk is an integrally bladed rotor disk.

8. The low pressure turbine rotor disk of claim 7, and further comprising:
   the integrally bladed rotor disk is a cast rotor disk.

9. The low pressure turbine rotor disk of claim 8, and further comprising:
   the cast rotor disk is formed from a casting process that includes a hot isostatic press of such a pressure that an amount of voids left in the cast piece is reduced.

10. The low pressure turbine rotor disk of claim 1, and further comprising:
    a plurality of axial aligned cooling air hole in the rotor disk each opening into the cavity on one side and opening onto the aft end of the rotor disk on the other side.

11. The low pressure turbine rotor disk of claim 10, and further comprising:
    the plurality of axial aligned holes is evenly spaced around the rotor disk in order to balance the rotor disk.

12. The low pressure turbine rotor disk of claim 1, and further comprising:
    the diameter of the cavity is about one half the diameter of the overall turbine rotor disk.

13. A small twin spool gas turbine engine comprising:
    a stator vane assembly positioned between a high pressure turbine rotor disk and a low pressure turbine rotor disk;
    the stator vane assembly including an inner shroud forming a high speed bearing support surface and a low speed bearing support surface;
    the low pressure turbine rotor disk rotatably mounted to an inner rotor shaft, the low pressure turbine rotor disk having a central axial opening to allow for a rotor shaft to be secured to the rotor disk and a cavity separate from the central axial opening and opening on the forward side of the disk;
    a low speed bearing supported for relative rotation between the inner shroud low speed bearing support surface and the inner rotor shaft; and,
    the cavity having a diameter and an axial length such that the low speed bearing is fully contained within the cavity.

14. The small twin spool gas turbine engine of claim 13, and further comprising:
    the rotor disk cavity includes an axial inner surface;
    the inner shroud of the stator vane assembly includes an axial outer surface and closely positioned to the axial inner surface of the rotor disk cavity; and,
    a knife edge seal to seal the close space between the axial inner surface of the cavity and the axial outer surface of the inner shroud.

15. The small twin spool gas turbine engine of claim 13, and further comprising:
    the high speed bearing support surface and the low speed bearing support surface on the inner shroud has substantially the same radial diameters.

16. The small twin spool gas turbine engine of claim 13, and further comprising:
    the inner shroud includes an annular groove on the inner surface adjacent to the outer race of the low speed bearing; and, a damping ring mounted in the annular groove and in contact with the outer race of the low speed bearing.

17. The small twin spool gas turbine engine of claim 13, and further comprising:
   an inner bearing housing rotatably secured to the inner rotor shaft and supporting the inner race of the low speed bearing; and,
   the inner bearing housing having an axial abutment surface in contact with a forward side of the inner race to prevent axial displacement of the inner race in the forward direction.

18. The small twin spool gas turbine engine of claim 17, and further comprising:
   the low pressure turbine rotor disk includes an inner race axial abutment surface in contact with the inner race of the low speed bearing, the inner race being pinched between the axial abutment surfaces of the inner bearing housing and the rotor disk.

19. The small twin spool gas turbine engine of claim 18, and further comprising:
   a nut threaded onto the aft end of the inner rotor shaft produces a compressive preload of the inner bearing race between the inner bearing housing and the rotor disk.

* * * * *